(12) United States Patent
Sen et al.

(10) Patent No.: US 11,374,602 B2
(45) Date of Patent: *Jun. 28, 2022

(54) SYSTEM AND METHOD FOR SIGNAL INTERFERENCE REJECTION USING HUMAN BODY COMMUNICATION

(71) Applicant: Purdue Research Foundation, West Lafayette, IN (US)

(72) Inventors: Shreyas Sen, West Lafayette, IN (US); Shovan Maity, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/127,808

(22) Filed: Dec. 18, 2020

(65) Prior Publication Data

US 2021/0111744 A1  Apr. 15, 2021

Related U.S. Application Data

(62) Division of application No. 16/518,950, filed on Jul. 22, 2019, now Pat. No. 10,873,354.

(60) Provisional application No. 62/701,424, filed on Jul. 20, 2018.

(51) Int. Cl.
*H04B 5/00* (2006.01)
*H04B 1/12* (2006.01)
*H04B 1/10* (2006.01)
*H04B 13/00* (2006.01)

(52) U.S. Cl.
CPC .............. *H04B 1/123* (2013.01); *H04B 1/109* (2013.01); *H04B 13/005* (2013.01)

(58) Field of Classification Search
CPC ...... H04B 13/005; H04B 1/123; H04B 1/109; H04W 4/008
See application file for complete search history.

(56) References Cited

U.S. PATENT DOCUMENTS

| 10,873,354 B2* | 12/2020 | Sen | H04B 1/0007 |
| 2010/0040114 A1* | 2/2010 | Kim | H04B 13/005 |
| | | | 375/E1.001 |
| 2016/0327592 A1* | 11/2016 | Hewson | G01R 15/181 |
| 2017/0052242 A1* | 2/2017 | Geveci | G01R 35/005 |

* cited by examiner

*Primary Examiner* — Tuan Pham
(74) *Attorney, Agent, or Firm* — Purdue Research Foundation (57) ABSTRACT

A communication interference rejection system comprising a receiver operatively connected to a device connected to a body of a user. The receiver is configured to receive a signal transmitted through the body of the user, the signal comprising a data component and an interference component, the interference component due to human body antenna effect. The receiver is configured to integrate the signal using a relatively low-gain analog integrator and then digitally differentiate the output of said integration.

2 Claims, 9 Drawing Sheets

SYSTEM AND METHOD FOR SIGNAL INTERFERENCE REJECTION USING HUMAN BODY COMMUNICATION

CROSS-REFERENCE TO RELATED APPLICATIONS

The present disclosure is a divisional of U.S. patent application Ser. No. 16/518,950, filed Jul. 22, 2019, which claims the priority benefit of U.S. Provisional Patent Application Ser. No. 62/701,424, filed Jul. 20, 2018, the contents of which are hereby incorporated by reference in its entirety.

TECHNICAL FIELD

The present disclosure is related to electronic communication systems, and more specifically, to electronic authentication systems which use the human body as part of a signal transmission path.

BACKGROUND

The continuous reduction of size of unit computing has propelled the growth of wearable sensors and computing devices (e.g. Fitness trackers, Smart watches). Soon, the human body will become a platform for interconnected wearable smart devices, which will aid and improve human quality of life. This calls for efficient ways to connect these wearable devices on the human body. Moreover, since each individual will be wearing a large amount of information on their body (i.e., the Human Intranet), they can now transmit this information to other humans or machines (Human Internet) at their will or use this information for secure authentication. Such on-body wearable devices are typically interconnected using a wireless body area network (WBAN). Human Body Communication (HBC) has recently emerged as a strong contender for this human body network, as it provides ultra-low power (ULP) and increased security, compared to WBAN. ULP is achieved as human body is used as a conducting medium, which exhibits significantly lower loss than radio frequency propagation through air. HBC is more secure as the information is contained within the human body and cannot be snooped on unless the person is physically touched, unlike WBAN, where the wireless signals can be easily snooped on by an attacker.

One disadvantage of HBC is that the human body acts as an antenna at the FM frequency band. This has been the biggest bottleneck in high-speed ULP HBC implementation. Signaling techniques that allow circumvention of the interference, such as adaptive frequency hopping (AFH) and fixed narrowband signaling have been proposed. However, such systems provide no way to suppress the interference other than avoiding it using adaptive/fixed narrowband signaling, which leads to energy-inefficient implementation and requires bulky filters. Therefore, improvements are needed in the field.

DETAILED DESCRIPTION

Throughout this description, some aspects are described in terms that would ordinarily be implemented as software programs. Those skilled in the art will readily recognize that the equivalent of such software can also be constructed in hardware, firmware, or micro-code. Because data-manipulation algorithms and systems are well known, the present description is directed in particular to algorithms and systems forming part of, or cooperating more directly with, systems and methods described herein. Other aspects of such algorithms and systems, and hardware or software for producing and otherwise processing signals or data involved therewith, not specifically shown or described herein, are selected from such systems, algorithms, components, and elements known in the art. Given the systems and methods as described herein, software not specifically shown, suggested, or described herein that is useful for implementation of any aspect is conventional and within the ordinary skill in such arts.

Various aspects relate to communication systems utilizing the human body as an electrical signal pathway.

The present disclosure provides an electronic communication system which utilizes a relatively low-gain analog integrator followed by analog to digital conversion and digital differentiation of a signal received by a worn receiver from a worn transmitter, which enables low energy, secure communication necessary for such energy constrained systems. The present disclosure also provides an electronic communication system which utilizes a relatively high-gain analog integrator in a wearable receiver of a signal transmitted by a worn transmitter, wherein the integrator output signal saturates to rail-to-rail voltages.

In view of the foregoing, various aspects provide improved reliability of an electronic communication system.

A technical effect is to electronically communicate data between wearable communications devices connected to the human body.

Figure 1A:
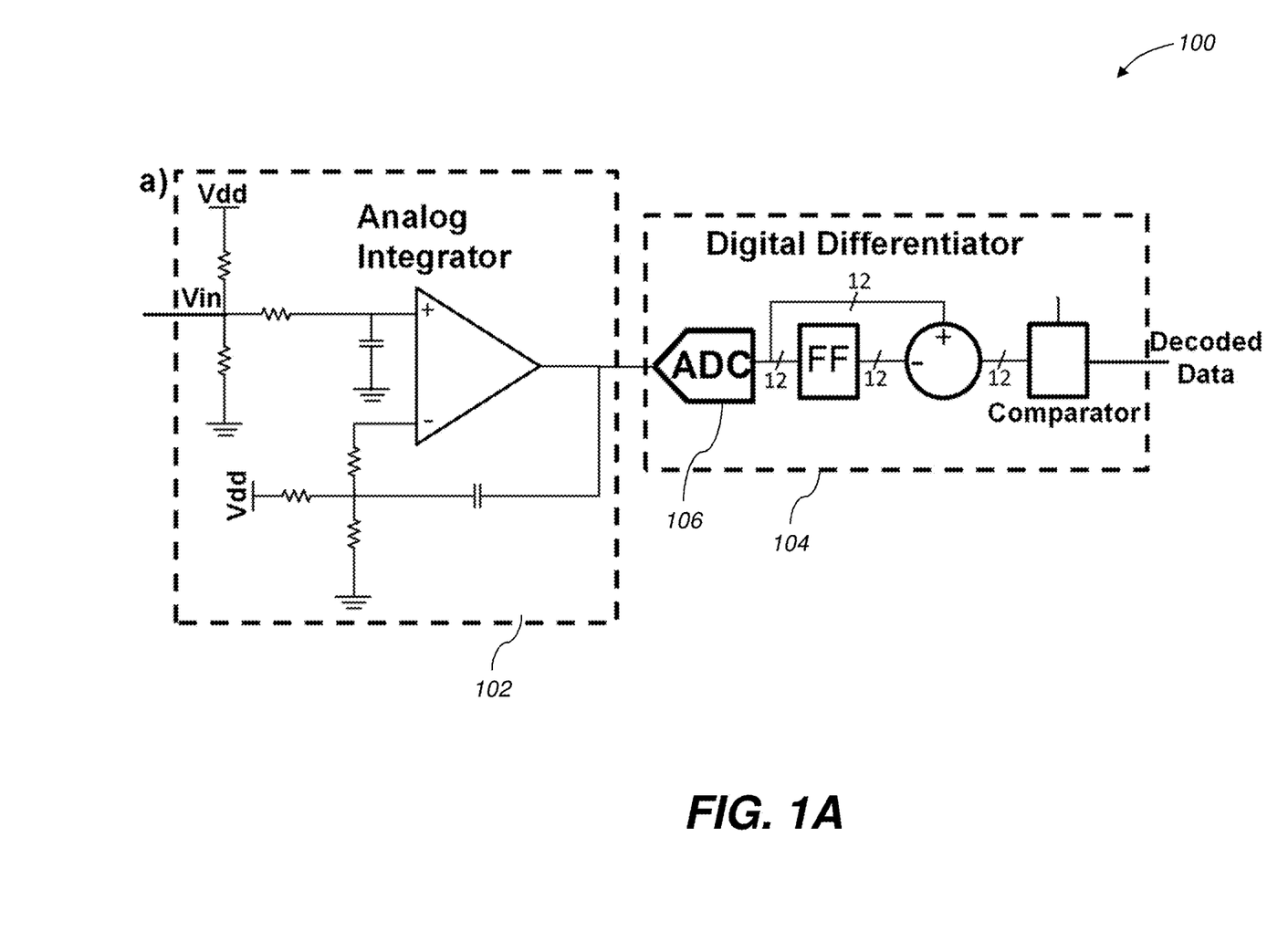
FIG. 1A is a schematic diagram of a worn receiver front-end circuit which receives an HBC signal from a worn transmitter according to one embodiment.
Figure 1B:
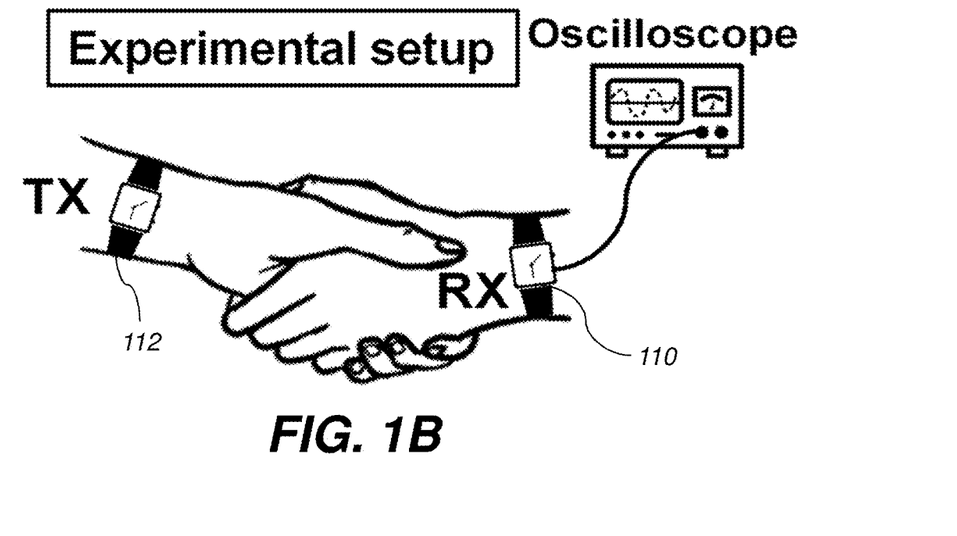
FIG. 1B is a diagram showing an experimental setup according to one embodiment.
Figure 1C:
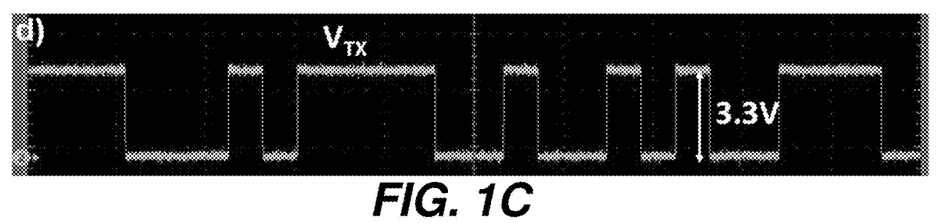
FIG. 1C is a plot showing a transmitted signal which is received by a receiver.
Figure 1D:
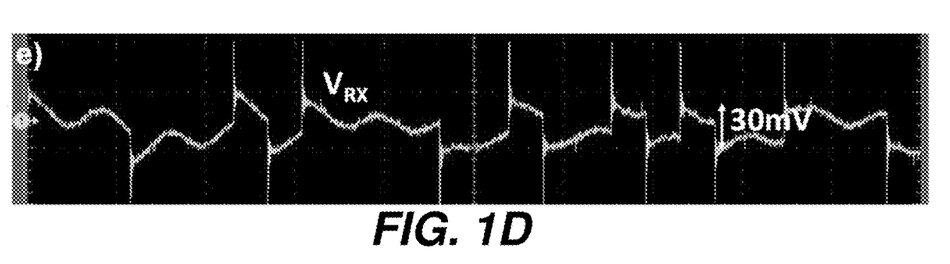
FIG. 1D shows the received signal of FIG. 1C after DC biasing has been applied.
Figure 1E:
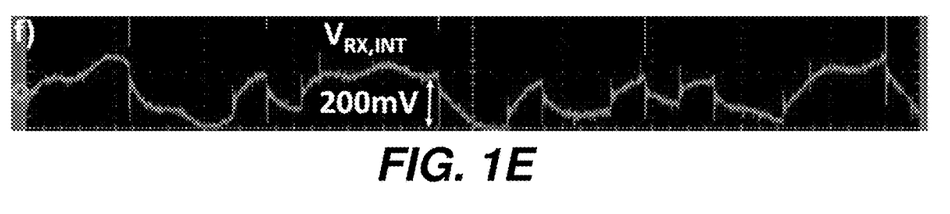
FIG. 1E shows the signal of FIG. 1D after an integrator has been applied.
Figure 1F:
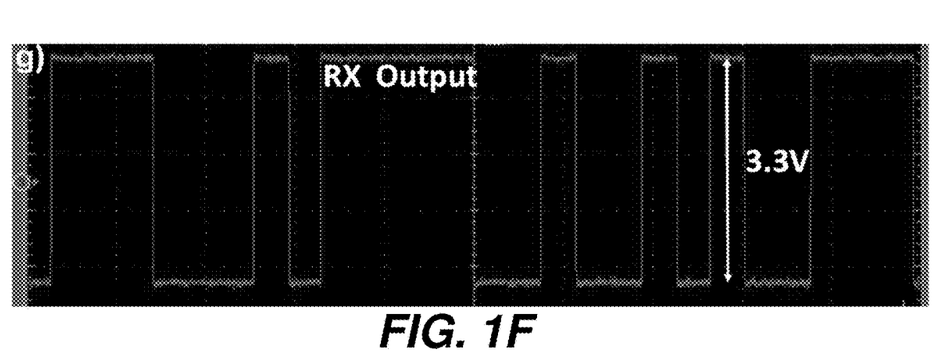
FIG. 1F shows a decoded output after the signal of FIG. 1E has been processed through a digital differentiator circuit according to one embodiment.

The human body can be used as a broadband (BB) channel for data transmission. A broadband channel with ~MHz bandwidth can enable data transmission at megabits/second speed which is sufficient for applications like image, data transfer. FIG. 1A shows a detailed circuit diagram 100 of a worn receiver 110 having a front-end circuit which receives an HBC signal from a transmitter 112 worn by a user (see FIG. 1B). As shown, the input signal is integrated through an analog integrator 102 and processed through a digital differentiator 104. The signal output from the integrator 102 is first directed to an analog-to-digital converter (ADC) 106. The signal decoding is achieved by taking a difference between two consecutive sampled values. FIG. 1C shows the transmitted signal which is received by the receiver. FIG. 1D shows the received signal with DC biasing. FIG. 1E shows the integrated received signal, which is applied to the ADC. FIG. 1F shows the decoded output. In the illustrated example, the received signal(30 mV) is significantly attenuated from the transmitted value(3.3V) and does not contain a DC component.

Since the received broadband signal is low and susceptible to interference picked up by human body antenna effect, its Signal to Interference-plus-Noise Ratio (SINR) is low. Analog Integration (1) improves the SINR, but (2) introduces inter-symbol interference (i.e. the present integrated value of the sample is dependent on the past symbol).

SINR improvement through Analog Integration: To detect this signal with COTS (common off-the-shelf) components the received signal is integrated before being applying to an onboard ADC (106). Since the received data is broadband (constant over symbol duration) and the interference is a narrowband sinusoidal wave, the SINR significantly improves through integration. A higher integration period will result in a larger SINR as the integrated data keeps on increasing but the interference integration does not increase proportionally.

ISI due to Analog Integration: In the absence of integration with reset, due to a COTS based implementation, the starting point of the integration is dependent on the previous bit.

Digital Differentiation: To remove the ISI before bit-decision, differentiation is required to decode the received signal, which is done in the digital domain by sampling the integrated signal through an onboard 12-bit ADC (106). The difference between two consecutive samples of the ADC 106 is used to decode the received data. A positive difference between consecutive samples is decoded as 1, whereas the negative difference between samples is decoded as 0.

Figure 2A:
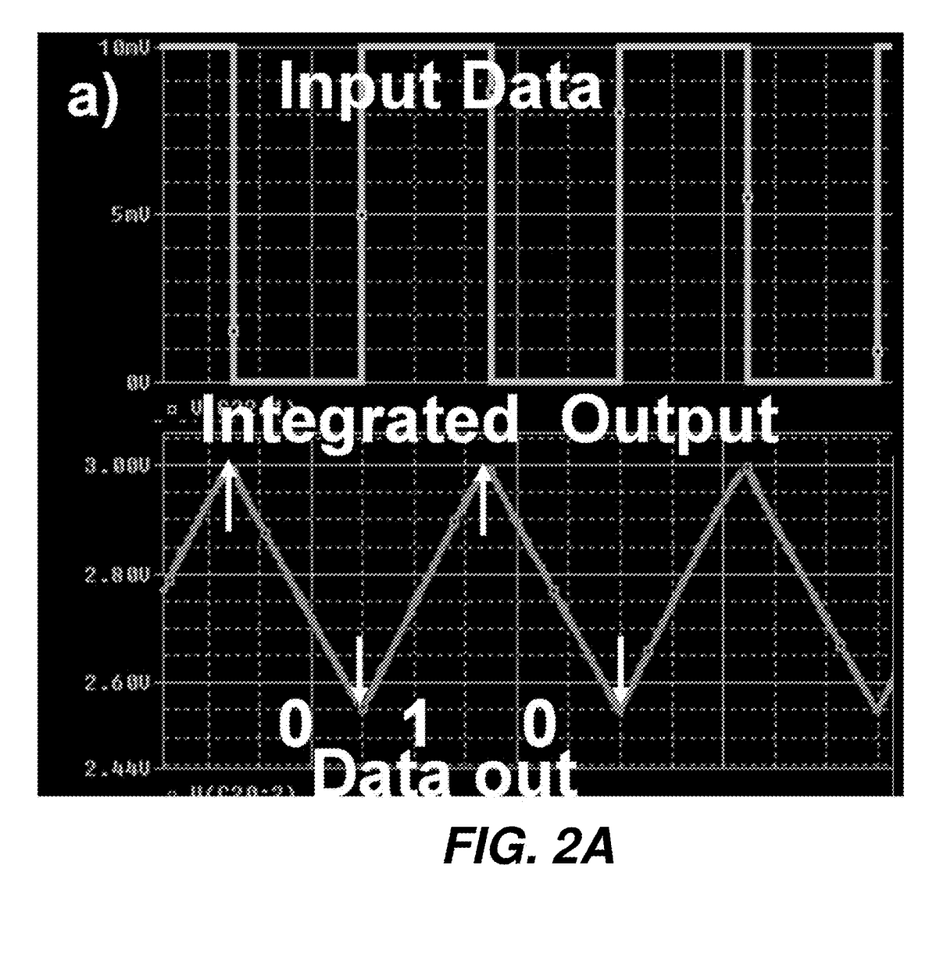
FIG. 2A shows a simulation waveform for the integrator with gain such that the output is not rail to rail and differentiation is needed in the digital domain by sampling the integrator output through an ADC, when data amplitude is 10 mV and there is no interference.
Figure 2B:
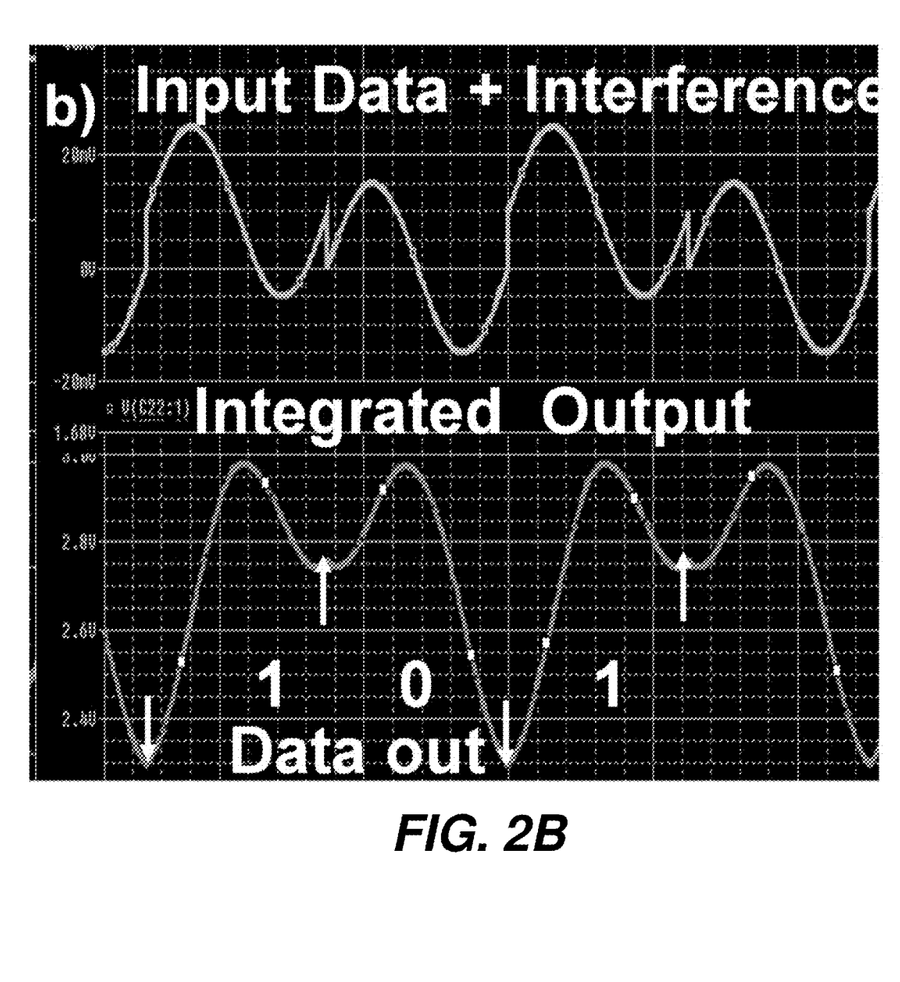
FIG. 2B shows a simulation waveform for the integrator with gain such that the output is not rail to rail and differentiation is needed in the digital domain by sampling the integrator output through an ADC, when data amplitude is 10 mV and interference is 10 mV.

The above scheme enables interference robust Broadband HBC with COTS components. FIGS. 2A and 2B show simulation waveforms for the integrator 102 with gain such that the output is not rail to rail and differentiation is needed in the digital domain by sampling the integrator output through an ADC 106. FIG. 2A shows waveforms corresponding to the case when data amplitude is 10 mV and there is no interference. FIG. 2B shows waveforms corresponds to the case with 10 mV data amplitude and 10 mV interference.

Figure 3A:
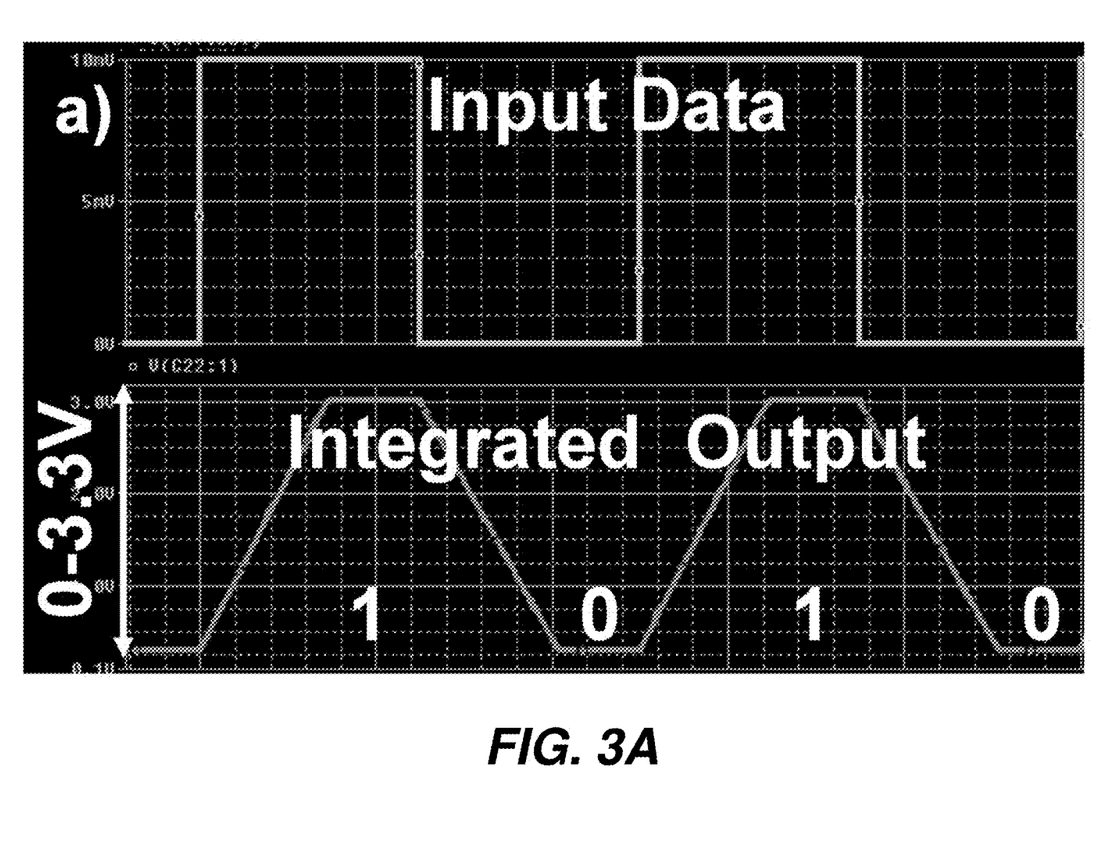
FIG. 3A shows a simulation waveform for which integrator gain is high enough for integrator output to have rail to rail voltage swing, when data amplitude is 10 mV and there is no interference.
Figure 3B:
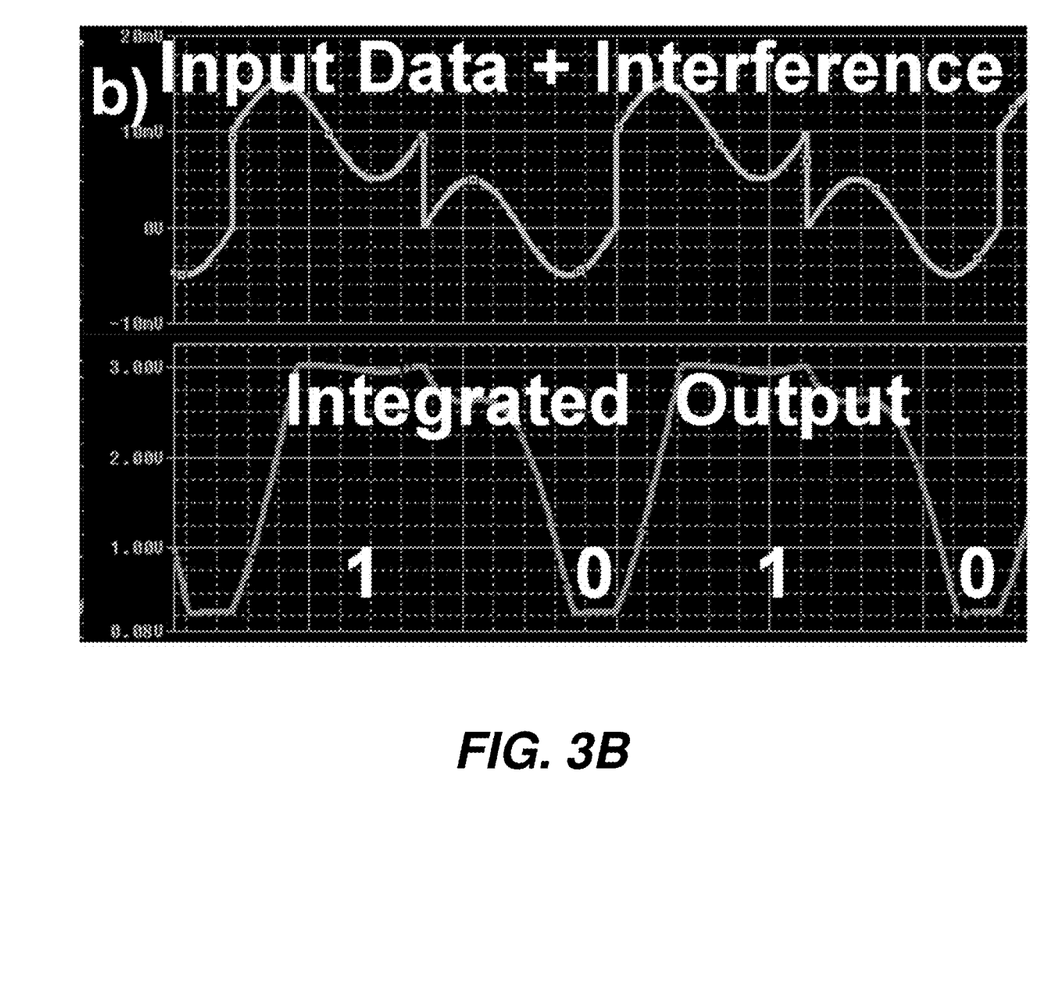
FIG. 3B shows a simulation waveform for which integrator gain is high enough for integrator output to have rail to rail voltage swing, when data amplitude is 10 mV and interference amplitude is 10 mV.

In another embodiment, the signal is integrated with a high gain integrator so that the output signal saturates to rail to rail voltages. One advantage of this approach is that it will enable usage of standard serial I/O protocols for data transfer between two devices as the integrator 102 output is full scale and can be decoded as a digital signal by the receiving board. The interference along with the data is integrated with a high gain in this method. So, the interference rejection property of the integration is reduced since the data signal saturates to one of the rail voltages and the SINR improvement is less. Also if the interference signal is high enough and the integrator gain is also high then it can potentially saturate the receiver. So for better SINR performance the integration followed by differentiation approach is more suitable but the decoding scheme is more complex in that scenario. This scheme therefore provides high gain analog integration which can achieve interference rejection up to a certain amplitude ratio of interference and input data. However due to rail to rail available output, this can be easily interfaced with any standard serial protocol. FIGS. 3A and 3B show simulation waveforms for which integrator gain is high enough for integrator output to have rail to rail voltage swing. FIG. 3A shows the case corresponding to which data amplitude is 10 mV and there is no interference. FIG. 3B shows the case where data amplitude is 10 mV and interference amplitude is 10 mV.

An advantage of the above methodology is that it can enable usage of standard serial protocol like UART as the output is rail to rail and can be decoded as a digital bit at the receiver end. There is no need to employ a custom communication protocol. However, if the interference amplitude is significantly larger than the data amplitude then there will be false transitions to 1 or 0 due to high gain of the integrator resulting in bit errors.

Figure 4:
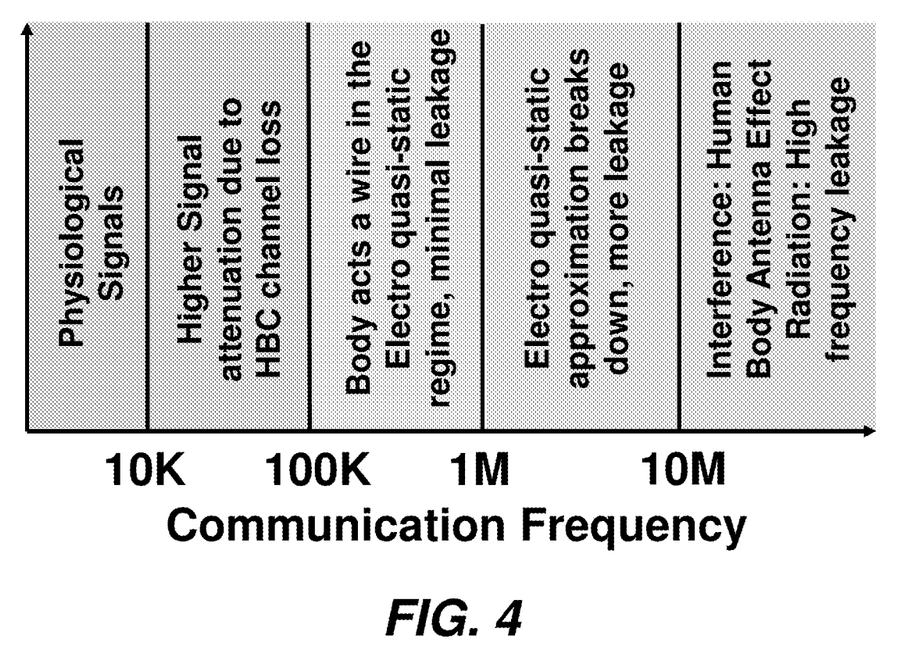
FIG. 4 shows the main categories of frequencies in the communication spectrum.

The frequency of operation of the presently disclosed HBC system 100 is preferably chosen to be in the range of 100s of KHz (e.g., 100 KHz-1 MHz). The low frequency operation results in less radiation from the body. As a result the signal transmission occurs only when the receiver and transmitter electrodes are in touch with the human body. Lower frequency operation has lower radiation but any frequency in the range of 10s of KHz is affected by higher human body channel loss and interference from other physiological signals. Higher frequency results in more radiation/leakage from the body and the human body antenna effect also results in more interference being picked up from the environment. Hence, the present disclosure uses the 100 KHz-1 MHz frequency range as the operating frequency range for the presently disclosed COTS based HBC system, as shown in FIG. 4. In human computer interaction system it is extremely important that the signal goes from the transmitter to the receiver only when the user is in physical contact with both of them and communication stops as soon as there is loss of touch in either of the transmitter/receiver end. The proposed frequency range enables communication only during touch by minimizing radiation while also maintaining low enough channel loss to be able to decode the received signals correctly.

The presently disclosed COTS based interference rejecting receiver can be used in different interaction through HBC. These interactions can be classified as Intra-human, Inter-human, human-machine or machine-machine interaction. Transfer of data from an implantable device to a body worn hub is an example of intra-human HBC. Inter-human HBC enables transfer of Business Card, Password, Facebook/LinkedIn request during handshaking. Transfer of images between a computer and a ring worn on the fingers of a person, human position tracking, secure authentication through a body worn personal key, downloading medical or other data stored in a wearable to a machine during typing or by touch are possible examples of human-machine interaction. Pairing between two devices, transfer of an image between a camera and a printer are possible scenarios of machine-machine interaction, where the human body can act as a connector through HBC Steps of various methods described herein can be performed in any order except when otherwise specified, or when data from an earlier step is used in a later step. Exemplary method(s) described herein are not limited to being carried out by components particularly identified in discussions of those methods.

Figure 5:
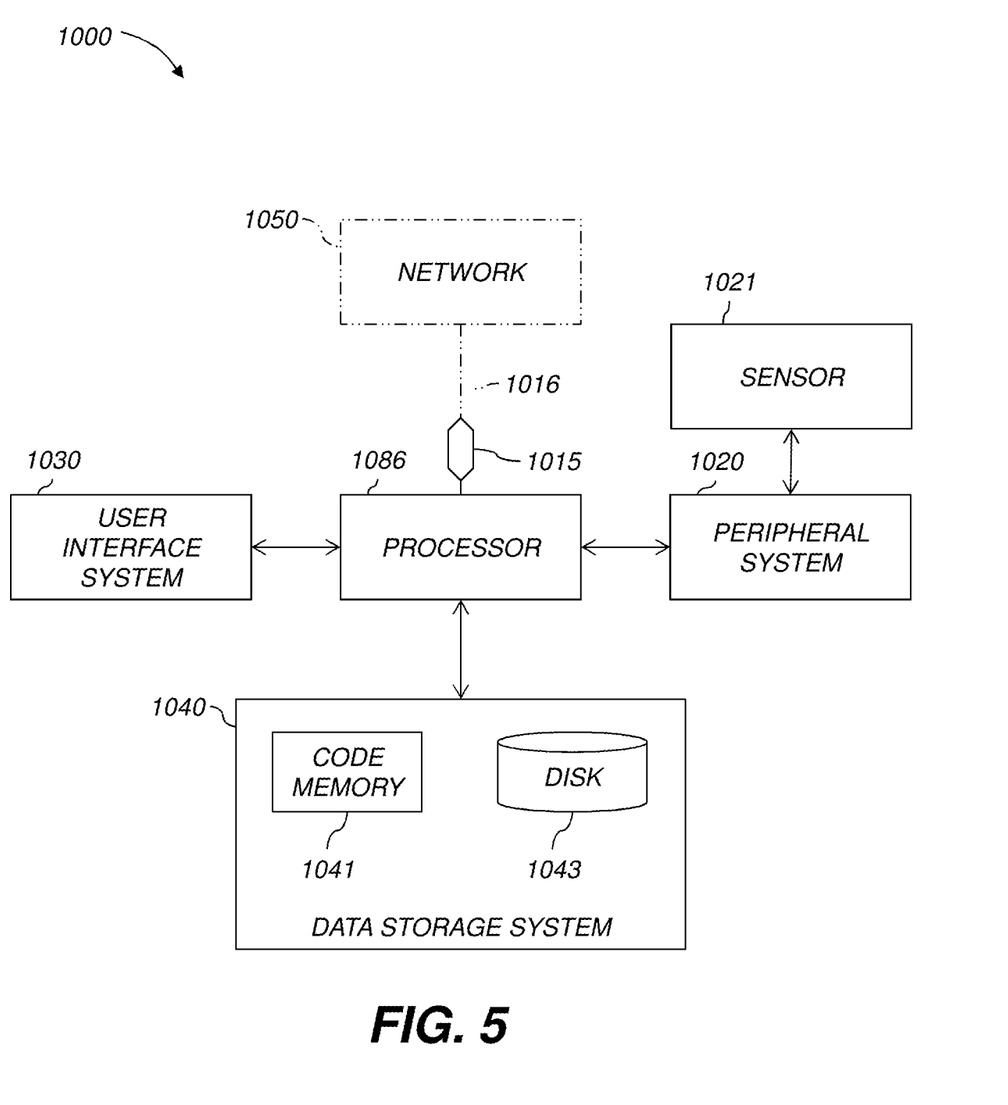
FIG. 5 is a diagram showing the components of an exemplary data-processing system according to one embodiment.

FIG. 5 is a high-level diagram showing the components of an exemplary data-processing system 1000 for analyzing data and performing other analyses described herein, and related components. The system includes a processor 1086, a peripheral system 1020, a user interface system 1030, and a data storage system 1040. The peripheral system 1020, the user interface system 1030 and the data storage system 1040 are communicatively connected to the processor 1086. Processor 1086 can be communicatively connected to network 1050 (shown in phantom), e.g., the Internet or a leased line, as discussed below. The HBC data described herein may be received or sent through a human body via sensors 1021 (or similar transmitters) and/or displayed using display units (included in user interface system 1030) which can each include one or more of systems 1086, 1020, 1030, 1040, and can each connect to one or more network(s) 1050. Processor 1086, and other processing devices described herein, can each include one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs). Each of the driver circuits 14 and receivers 22 may include one or more of the processors 1086.

Processor 1086 can implement processes of various aspects described herein. Processor 1086 can be or include one or more device(s) for automatically operating on data, e.g., a central processing unit (CPU), microcontroller (MCU), desktop computer, laptop computer, mainframe computer, personal digital assistant, digital camera, cellular phone, smartphone, or any other device for processing data, managing data, or handling data, whether implemented with electrical, magnetic, optical, biological components, or otherwise. Processor 1086 can include Harvard-architecture components, modified-Harvard-architecture components, or Von-Neumann-architecture components.

The phrase "communicatively connected" includes any type of connection, wired or wireless, for communicating data between devices or processors. These devices or processors can be located in physical proximity or not. For example, subsystems such as peripheral system 1020, user interface system 1030, and data storage system 1040 are shown separately from the data processing system 1086 but can be stored completely or partially within the data processing system 1086.

The peripheral system 1020 can include one or more devices configured to provide digital content records to the processor 1086. For example, the peripheral system 1020 can include capacitive sensors 1021 or other sensors or transmitters for sending and receiving the signals described herein. The processor 1086, upon receipt of digital content records from a device in the peripheral system 1020, can store such digital content records in the data storage system 1040.

The user interface system 1030 can include a mouse, a keyboard, touchscreen, another computer (connected, e.g., via a network or a null-modem cable), or any device or combination of devices from which data is input to the processor 1086. The user interface system 1030 also can include a display device, a processor-accessible memory, or any device or combination of devices to which data is output by the processor 1086. The user interface system 1030 and the data storage system 1040 can share a processor-accessible memory.

In various aspects, processor 1086 includes or is connected to communication interface 1015 that is coupled via network link 1016 (shown in phantom) to network 1050. For example, communication interface 1015 can include an integrated services digital network (ISDN) terminal adapter or a modem to communicate data via a telephone line; a network interface to communicate data via a local-area network (LAN), e.g., an Ethernet LAN, or wide-area network (WAN); or a radio to communicate data via a wireless link, e.g., WiFi or GSM. Communication interface 1015 sends and receives electrical, electromagnetic or optical signals that carry digital or analog data streams representing various types of information across network link 1016 to network 1050. Network link 1016 can be connected to network 1050 via a switch, gateway, hub, router, or other networking device.

Processor 1086 can send messages and receive data, including program code, through network 1050, network link 1016 and communication interface 1015. For example, a server can store requested code for an application program (e.g., a JAVA applet) on a tangible non-volatile computer-readable storage medium to which it is connected. The server can retrieve the code from the medium and transmit it through network 1050 to communication interface 1015. The received code can be executed by processor 1086 as it is received, or stored in data storage system 1040 for later execution.

Data storage system 1040 can include or be communicatively connected with one or more processor-accessible memories configured to store information. The memories can be, e.g., within a chassis or as parts of a distributed system. The phrase "processor-accessible memory" is intended to include any data storage device to or from which processor 1086 can transfer data (using appropriate components of peripheral system 1020), whether volatile or non-volatile; removable or fixed; electronic, magnetic, optical, chemical, mechanical, or otherwise. Exemplary processor-accessible memories include but are not limited to: registers, floppy disks, hard disks, tapes, bar codes, Compact Discs, DVDs, read-only memories (ROM), erasable programmable read-only memories (EPROM, EEPROM, or Flash), and random-access memories (RAMs). One of the processor-accessible memories in the data storage system 1040 can be a tangible non-transitory computer-readable storage medium, i.e., a non-transitory device or article of manufacture that participates in storing instructions that can be provided to processor 1086 for execution.

In an example, data storage system 1040 includes code memory 1041, e.g., a RAM, and disk 1043, e.g., a tangible computer-readable rotational storage device such as a hard drive. Computer program instructions are read into code memory 1041 from disk 1043. Processor 1086 then executes one or more sequences of the computer program instructions loaded into code memory 1041, as a result performing process steps described herein. In this way, processor 1086 carries out a computer implemented process. For example, steps of methods described herein, blocks of the flowchart illustrations or block diagrams herein, and combinations of those, can be implemented by computer program instructions. Code memory 1041 can also store data, or can store only code.

Various aspects described herein may be embodied as systems or methods. Accordingly, various aspects herein may take the form of an entirely hardware aspect, an entirely software aspect (including firmware, resident software, micro-code, etc.), or an aspect combining software and hardware aspects These aspects can all generally be referred to herein as a "service," "circuit," "circuitry," "module," or "system."

Furthermore, various aspects herein may be embodied as computer program products including computer readable program code stored on a tangible non-transitory computer readable medium. Such a medium can be manufactured as is conventional for such articles, e.g., by pressing a CD-ROM. The program code includes computer program instructions that can be loaded into processor 1086 (and possibly also other processors), to cause functions, acts, or operational steps of various aspects herein to be performed by the processor 1086 (or other processor). Computer program code for carrying out operations for various aspects described herein may be written in any combination of one or more programming language(s), and can be loaded from disk 1043 into code memory 1041 for execution. The program code may execute, e.g., entirely on processor 1086, partly on processor 1086 and partly on a remote computer connected to network 1050, or entirely on the remote computer.

Various aspects are inclusive of combinations of the aspects described herein. References to "a particular aspect" (or "embodiment" or "version") and the like refer to features that are present in at least one aspect of the invention. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting. The word "or" is used herein in a non-exclusive sense, unless otherwise explicitly noted.

The invention has been described in detail with particular reference to certain preferred aspects thereof, but it will be understood that variations, combinations, and modifications can be effected by a person of ordinary skill in the art within the spirit and scope of the invention.

The invention claimed is:

1. A communication interference rejection system comprising:
    a receiver operatively connected to a device connected to a body of a user, the receiver configured to receive a signal transmitted through the body of the user, the signal comprising a data component and an interference component, said interference component due to human body antenna effect, said receiver configured to integrate the signal using a relatively high-gain analog integrator wherein the output of said integrator saturates to a rail-to-rail voltage to allow the receiver to decode the signal received from said integrator using a serial protocol.

2. The system of claim 1, wherein the signal is in the range of 100 KHz-1 MHz frequency band for Broadband Human Body Communication, wherein communication is enabled only when the transmitter and the receiver are in direct contact with the user.

* * * * *